US011772636B2

(12) United States Patent
Ishinoda

(10) Patent No.: US 11,772,636 B2
(45) Date of Patent: Oct. 3, 2023

(54) PARKING ASSIST APPARATUS AND A METHOD OF CONTROLLING THE PARKING ASSIST APPARATUS

(71) Applicant: Faurecia Clarion Electronics Co., Ltd., Saitama (JP)

(72) Inventor: Makoto Ishinoda, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 249 days.

(21) Appl. No.: 17/323,054

(22) Filed: May 18, 2021

(65) Prior Publication Data

US 2021/0370916 A1    Dec. 2, 2021

(30) Foreign Application Priority Data

May 28, 2020 (JP) ................................. 2020-093191

(51) Int. Cl.
*B60W 30/06* (2006.01)
*B60W 10/04* (2006.01)
(Continued)

(52) U.S. Cl.
CPC ............ *B60W 30/06* (2013.01); *B60W 10/04* (2013.01); *B60W 10/18* (2013.01); *B60W 10/20* (2013.01);
(Continued)

(58) Field of Classification Search
CPC ...... B60W 30/06; B60W 10/04; B60W 10/18; B60W 10/20; B60W 2710/18;
(Continued)

(56) References Cited

U.S. PATENT DOCUMENTS

2002/0038171 A1 * 3/2002 Deguchi ............ B62D 15/0265
180/443
2010/0045448 A1 * 2/2010 Kakinami .............. G08G 1/168
382/154
(Continued)

FOREIGN PATENT DOCUMENTS

JP      2011-046335 A      3/2011
WO      2018/186252 A1    10/2018
WO      WO-2018186252 A1 * 10/2018 ............ B60W 30/06

OTHER PUBLICATIONS

A Extended European Search Report mailed by European Patent Office dated Sep. 24, 2021 in corresponding European patent application No. 21176001.2-1009.

*Primary Examiner* — Yonel Beaulieu
*Assistant Examiner* — Jean W Charleston
(74) *Attorney, Agent, or Firm* — IP BUSINESS SOLUTIONS, LLC

(57) ABSTRACT

A parking assist apparatus uses vehicle information and the recognition result of a peripheral recognition unit to calculate a plurality of patterns of parking paths, in which the radius of curvature of each of the arcs included in the parking paths is differentiated, as parking paths to park a vehicle at a parking area, by a parking path calculation unit. In addition, the parking assist apparatus selects, among the plurality patterns of parking paths, a parking path with both a minimum number of times of driving operations for changing an advancing direction of the vehicle from forward to reverse or reverse to forward, and the radius of curvature of the arc that is largest, by a parking path selection unit.

2 Claims, 7 Drawing Sheets

(51) Int. Cl.
*B60W 10/18* (2012.01)
*B60W 10/20* (2006.01)

(52) U.S. Cl.
CPC ..... *B60W 2710/18* (2013.01); *B60W 2710/20* (2013.01)

(58) Field of Classification Search
CPC .. B60W 2710/20; B60W 40/00; B60W 40/02; B62D 15/0285
USPC ........................................................ 701/25
See application file for complete search history.

(56) References Cited

U.S. PATENT DOCUMENTS

| | | | | |
|---|---|---|---|---|
| 2010/0066515 | A1* | 3/2010 | Shimazaki | H04N 7/18 |
| | | | | 701/41 |
| 2011/0074957 | A1* | 3/2011 | Kiyohara | G06V 10/267 |
| | | | | 348/148 |
| 2015/0375740 | A1* | 12/2015 | Okamura | B62D 15/0285 |
| | | | | 701/25 |
| 2019/0286135 | A1* | 9/2019 | Yasuda | G05D 1/0223 |
| 2020/0276982 | A1* | 9/2020 | Shoda | B60W 30/06 |
| 2021/0086756 | A1 | 3/2021 | Hasejima et al. | |

\* cited by examiner

PARKING ASSIST APPARATUS AND A METHOD OF CONTROLLING THE PARKING ASSIST APPARATUS

INCORPORATION BY REFERENCE

The present application claims priority under 35 U.S.C. § 119 to Japanese Patent Application No. 2020-093191 filed on May 28, 2020. The content of the application is incorporated herein by reference in its entirety.

BACKGROUND OF THE INVENTION

Field of the Invention

The present invention is related to a parking assist apparatus and a method of controlling the parking assist apparatus.

Description of the Related Art

Japanese Patent Laid-Open No. 2011-46335 represents a technique related to automatic parking.

The abstract of Japanese Patent Laid-Open No. 2011-46335 describes as follows: "A parking frame position obtaining unit 21 obtains one or a plurality of parking frame positions from images of cameras 3 to 6 mounted on the vehicle. An evaluation part 24 evaluates an operation burden of a driver for a plurality of parking paths, and based on this evaluation result, a parking path selection unit 25 selects a parking path with a minimum operation burden of a driver and displays it on an on-vehicle monitor 13."

Japanese Patent Laid-Open No. 2011-46335 describes the features that "the parking path selection means selects a parking path having a minimum number of times of back-and-forth maneuvering" and that "when there is a plurality of parking path having a minimum number of times of back-and-forth maneuvering, the parking path selection means selects a parking path having the smallest manipulation amount of steering among the parking paths having the minimum number of times of back-and-forth maneuvering."

Japanese Patent Laid-Open No. 2011-46335 discloses a technique of, when a plurality of parking frames is obtained, generating parking paths for respective parking frames to generate a parking path among them by which an operating burden on the driver becomes the smallest. As a result, when only one parking frame is obtained, there arises a situation in which the parking path has a large left-and-right steering angle and a large number of times of back-and-forth maneuvering, causing a fear of disadvantage for ride quality of passengers.

In addition, the parking path in Japanese Patent Laid-Open No. 2011-46335 is configured to have a curved portion in which a reference clothoid curve is extended similarly. As a result, a radius of curvature of the curved portion depends on the rate of similarity expansion, and it is not possible to increase the radius of curvature for improving ride quality and the like.

The present invention is directed to providing a parking assist apparatus that can specify parking paths advantageous for improving the ride quality and comfort, and a method of controlling the parking assist apparatus.

SUMMARY OF THE INVENTION

One aspect of the present invention is a parking assist apparatus comprising: a peripheral recognition unit configured to recognize peripheral information of a vehicle; a parking area detection unit configured to detect a parking area in which the vehicle can be parked by using recognition result of the peripheral recognition unit; a parking path calculation unit configured to calculate a plurality of patterns of parking paths as parking paths along which the vehicle is parked in the parking area by using information of the vehicle and recognition result of the peripheral recognition unit, the plurality of patterns of parking paths each including an arc, a radius of curvature of which is different from one parking path to another; and a parking path selection unit configured to select, among the plurality of patterns of parking paths, a parking path with both a minimum number of times of driving operations for changing an advancing direction of the vehicle from forward to reverse or reverse to forward, and the radius of curvature of the arc that is largest.

According to the present invention, it is possible to specify parking paths advantageous for improving the ride quality and comfort.

DETAILED DESCRIPTION OF THE PREFERRED EMBODIMENT

Hereinafter, the embodiment of the present invention is described with reference to the drawings.

Figure 1:
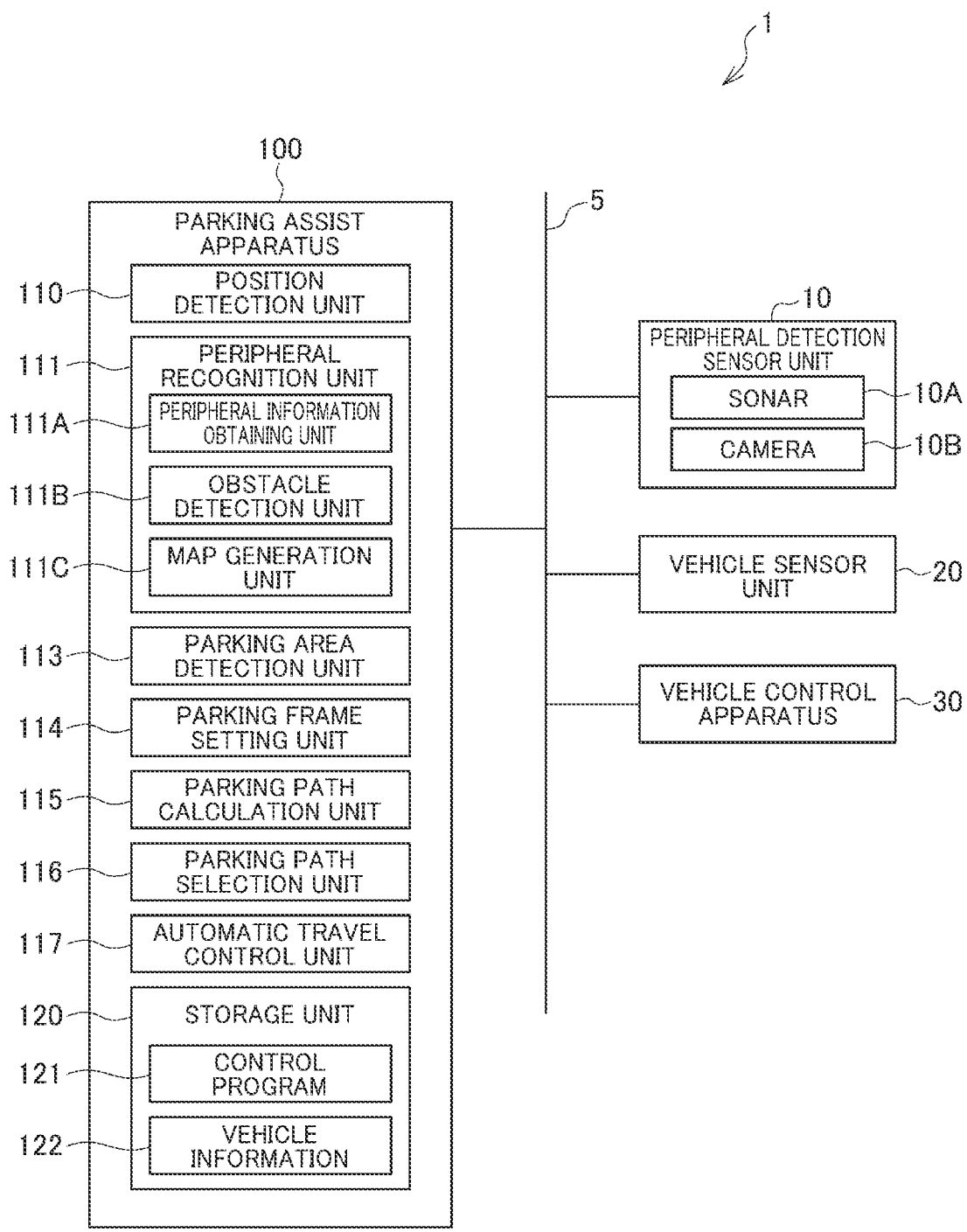
FIG. 1 is a diagram showing the structure of a vehicle mounted with the parking assist apparatus according to the embodiment of the present invention.

FIG. 1 is a diagram showing the structure of a vehicle 1 mounted with a parking assist apparatus 100 according to the present embodiment.

The vehicle 1 comprises a peripheral detection sensor unit 10, a vehicle sensor unit 20, a vehicle control apparatus 30, and a parking assist apparatus 100, and these are connected through a vehicle-mounted network 5 such as a CAN (Controller Area Network) bus so as to communicate data.

The peripheral detection sensor unit 10 comprises various kinds of sensors for detecting information on the periphery of the vehicle 1, and outputs detection results (output) to a parking assist apparatus 100. Hereinafter, the information on the periphery is referred to as the "peripheral information."

The peripheral information includes information on objects existing in a periphery of the vehicle 1, wherein the objects are obstacles, and division lines dividing a parking lot of the vehicle 1, for example. The obstacles are various objects that can be obstruction to the travel of the vehicle 1. Typical examples of the obstacles are building structures such as pillars, walls and fire hydrants, other vehicles while parking and traveling, and passersby.

The peripheral detection sensor unit 10 of the present embodiment comprises a sonar 10A and a camera 10B.

The sonar 10A is a distance measuring sensor of detecting a peripheral obstacle with sound waves to measure the distance between the obstacle and the vehicle 1. The sonar 10A is provided on the left and right sides or the like of the vehicle 1, and can detect objects in the periphery of a parking area Q in which the vehicle 1 is to be parked. Note that other distance measuring sensors such as a radar and a Lidar may be used instead of the sonar 10A.

The camera 10B functions as an imaging unit capturing images in the periphery of the vehicle 1. The camera 10B is provided so as to be able to capture images in the front and back positions and the left and right positions of the vehicle 1, and can capture images of the parking area Q existing in the periphery of the vehicle 1. Note that the camera 10B may be ones respectively disposed in the front and back positions and the left and right positions of the vehicle 1, or a single camera being able to capture images in the front and back positions and the left and right positions by itself.

The vehicle sensor unit 20 has a sensor of obtaining information on each unit of the vehicle 1, and it is possible to detect a traveling state of the vehicle 1 and various information required for an autonomous navigation (dead reckoning). For example, the vehicle sensor unit 20 has a gyro sensor, an acceleration sensor, a vehicle speed sensor, and a steering angle sensor of detecting a steering angle of the vehicle 1 and the like.

The vehicle control apparatus 30 controls a steering apparatus, a driving apparatus and a brake control apparatus of the vehicle 1 so as to automatically moves (automatic travel) the vehicle 1 based on parking paths described later, which are calculated by the parking assist apparatus 100. The vehicle control apparatus 30 comprises a computer having a processor to execute such a control (e.g., an ECU (Electronic Control Unit)). Note that the steering apparatus is an apparatus including an actuator for steering a steering wheel of the vehicle 1.

In addition, the driving apparatus is an apparatus including an actuator of adjusting driving force on the steering wheel of the vehicle 1. If a power source of the vehicle 1 is an engine, the actuator of the driving apparatus is a throttle actuator. If the power source is a motor, the actuator of the driving apparatus is a power source motor.

The brake control apparatus has an actuator of controlling a brake system provided in the vehicle 1 to control braking force of the vehicle 1 by the actuator.

The parking assist apparatus 100 is an apparatus configured to make the vehicle 1 automatically travel to the parking area Q so as to assist parking of the vehicle 1.

The parking assist apparatus 100 comprises processors not being shown (corresponding to the computers of the present invention) such as CPU (Central Processing Unit) and MPU (Microprocessor Unit), and storage apparatuses (corresponding to the storage unit 120 in FIG. 1) such as a memory, HDD (Hard Disk Drive) and SSD (Solid State Drive), an interface circuit for connecting sensors, peripheral devices and the like, and a vehicle-mounted network communication circuit of communicating with other vehicle mounted devices via the vehicle-mounted network 5. In the parking assist apparatus 100, a processor executes a control program 121 stored in the storage unit 120 so as to realize various functional configurations shown in FIG. 1.

Namely, the parking assist apparatus 100, by a function of the processor, functions as a position detection unit 110, a peripheral recognition unit 111, a parking area detection unit 113, a parking frame setting unit 114, a parking path calculation unit 115, a parking path selection unit 116, and an automatic travel control unit 117.

The position detection unit 110 detects the current position (self position) of the vehicle 1 based on detection result (output) by the vehicle sensor unit 20, using a publicly known or well-known dead reckoning method.

The peripheral recognition unit 111 comprises a peripheral information obtaining unit 111A, an obstacle detection unit 111B, and a map generation unit 111C. The peripheral information obtaining unit 111A obtains information on objects to be detected in the periphery of the vehicle 1, based on detection result by the peripheral detection sensor unit 10. For example, it detects division lines dividing the parking lot of the vehicle 1 by recognizing images of the camera 10B, so as to detect the positions of division lines and the like relative to the vehicle 1. The obstacle detection unit 111B detects obstacles in the periphery of the vehicle 1 based on detection result by the peripheral detection sensor unit 10. For example, it detects the obstacles in the periphery based on detection result by the sonar 10A so as to detect the positions of obstacles relative to the vehicle 1.

The map generation unit 111C generates map data based on detection result by the peripheral information obtaining unit 111A and the obstacle detection unit 111B. The map data is data in which positions of obstacles and the like are recorded to a local spatial coordinate having the current position of the vehicle 1 at an arbitral timing being set as the origin. The peripheral recognition unit 111 can recognize peripheral information related to the travel (including parking) of the vehicle 1 by the peripheral information obtaining unit 111A, the obstacle detection unit 111B and the map generation unit 111C based on detection result (output) by the peripheral detection sensor unit 10. Note that publicly known techniques can be widely applied to the technique of recognizing peripheral information related to the travel of the vehicle 1.

The parking area detection unit 113 detects the parking area Q in which the vehicle 1 is to be parked, based on the peripheral information recognized by the peripheral recognition unit 111. Here, FIG. 2 exemplifies a case where a parking frame between other vehicles 2 and 3 is recognized as the parking area Q. A publicly known or well-known technique may be used as a method of detecting the parking area Q based on the peripheral information. For example, the parking area detection unit 113 recognizes a rectangular area with a size in which the vehicle 1 can be parked, based on the distribution of obstacles shown by the map data, so as to detect the area as the parking area Q. The parking area detection unit 113 also recognizes, for example, division lines of a parking lot by image recognition of images captured by the camera 10B so as to detect the parking area Q.

When detecting the parking area Q, the parking area detection unit 113 converts, by a projection conversion from a two-dimensional coordinate system of a captured image to a local spatial coordinate system of map data, the position of the parking area Q in the captured image to a position of the local spatial coordinate system of the map data. This projection conversion can be performed by a publicly known or well-known arbitral technique. The position of the parking area Q is specified by the projection conversion to the local spatial coordinate system.

The parking frame setting unit 114 sets, in the parking area Q, a rectangular parking frame defining a range in which the vehicle 1 is accommodated while parking, based on the parking area Q detected by the parking area detection unit 113. Note that, when the parking area Q is a parking lot divided by division lines, the parking frame setting unit 114 sets the division lines as the parking frame.

The parking path calculation unit 115 is a portion which implements a parking path calculation function of calculating a parking path of the vehicle 1 from the current position to the parking area Q. The parking path calculation unit 115 of the present embodiment calculates, based on the map data, a parking path along which reverse parking of the vehicle 1 is performed from the current position to the parking area Q. When calculating this parking path, the parking path calculation unit 115 can calculate a plurality of patterns of parking paths by differentiating the radius of curvature (may also be referred to as the turning radius) R of each of the arcs included in the parking paths. In other words, the parking path calculation unit 115 has a parking path calculation function for calculating parking paths including an arc of designated radius of curvature R.

Note that, depending on a value of a radius of curvature, there is a possibility that parking paths including an arc of the radius of curvature R cannot be calculated with a single back-and-forth maneuvering, for example. As a result, the parking path calculation unit 115 is configured so as to be capable of calculating parking paths including an arc of designated radius of curvature R as much as possible by appropriately changing the number of times of back-and-forth maneuvering.

In this way, the parking path calculation unit 115 can calculates a plurality of patterns of parking paths having a different radius of curvature R of an arc in the parking paths and having arbitrarily different numbers of times of back-and-forth maneuvering in the parking paths.

Note that back-and-forth maneuvering refers to a driving operation of changing an advancing direction of the vehicle 1 from forward to reverse or reverse to forward so as to change the approach angle of the vehicle 1 to the parking area Q, and it is sometimes referred to as switchback.

The parking path selection unit 116 extracts parking paths having the fewest number of times of back-and-forth maneuvering among the parking paths calculated by the parking path calculation unit 115, and among the extracted parking paths, selects parking paths having the largest radius of curvature R of the arc in the parking paths. By selecting parking paths with the fewest number of times of back-and-forth maneuvering and the largest radius of curvature R, it is possible to select paths, in which generation of external force jolting passengers back and forth or left and right while parking is suppressed, or in which the degree of the external force itself is suppressed; and this is advantageous for improving ride quality and comfort of passengers.

The automatic travel control unit 117 generates control information for advancing the vehicle 1 by automatic travel, and outputs the control information to the vehicle control apparatus 30. The automatic travel control unit 117 generates such control information for parking paths calculated by the parking path calculation unit 115.

The storage unit 120 stores the control program 121, and vehicle information 122 and the like containing information related to the minimum turning radius of the vehicle 1 in which this parking assist apparatus 100 is mounted. The minimum turning radius is information that can specify small-radius turning ability of the vehicle 1, and the vehicle information 122 may store the value of the minimum turning radius itself, or information for allowing the minimum turning radius to be calculated (the wheelbase of the vehicle 1, a distance between left and right steered wheels, the steering angle of outer and inner steered wheels at the time of maximum steering, and the like).

Next, an operation of the present embodiment will be explained.

While a passenger drives the vehicle 1 to move in a parking, in the parking assist apparatus 100, the peripheral recognition unit 111 continuously recognizes obstacles in the periphery (e.g., other vehicles 2 and 3 shown in FIG. 2) based on peripheral information, and positions of recognized obstacles are sequentially recorded in map data. Additionally, the parking area detection unit 113 continuously detects the parking area Q existing at a side of the vehicle 1 based on the distribution of obstacles shown by the map data, or based on the image recognition result of captured images.

Figure 2:
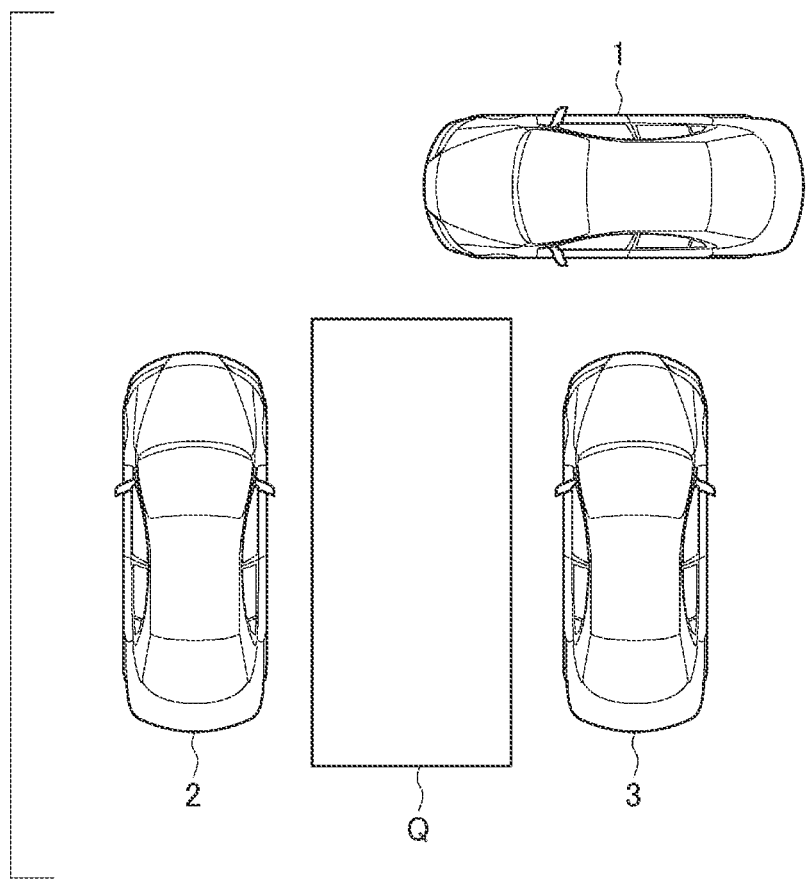
FIG. 2 is a diagram for explaining a parking area.

As shown in FIG. 2, when a passenger finds the parking area Q in front of the vehicle 1, the passenger stops the vehicle 1 and operates an HMI (Human Machine Interface) not being shown so as to instruct the parking assist apparatus 100 to perform automatic parking.

The parking assist apparatus 100 starts, when the instruction for automatic parking is input, parking assist processing for making the vehicle 1 to enter the parking area Q by automatic travel.

Figure 3:
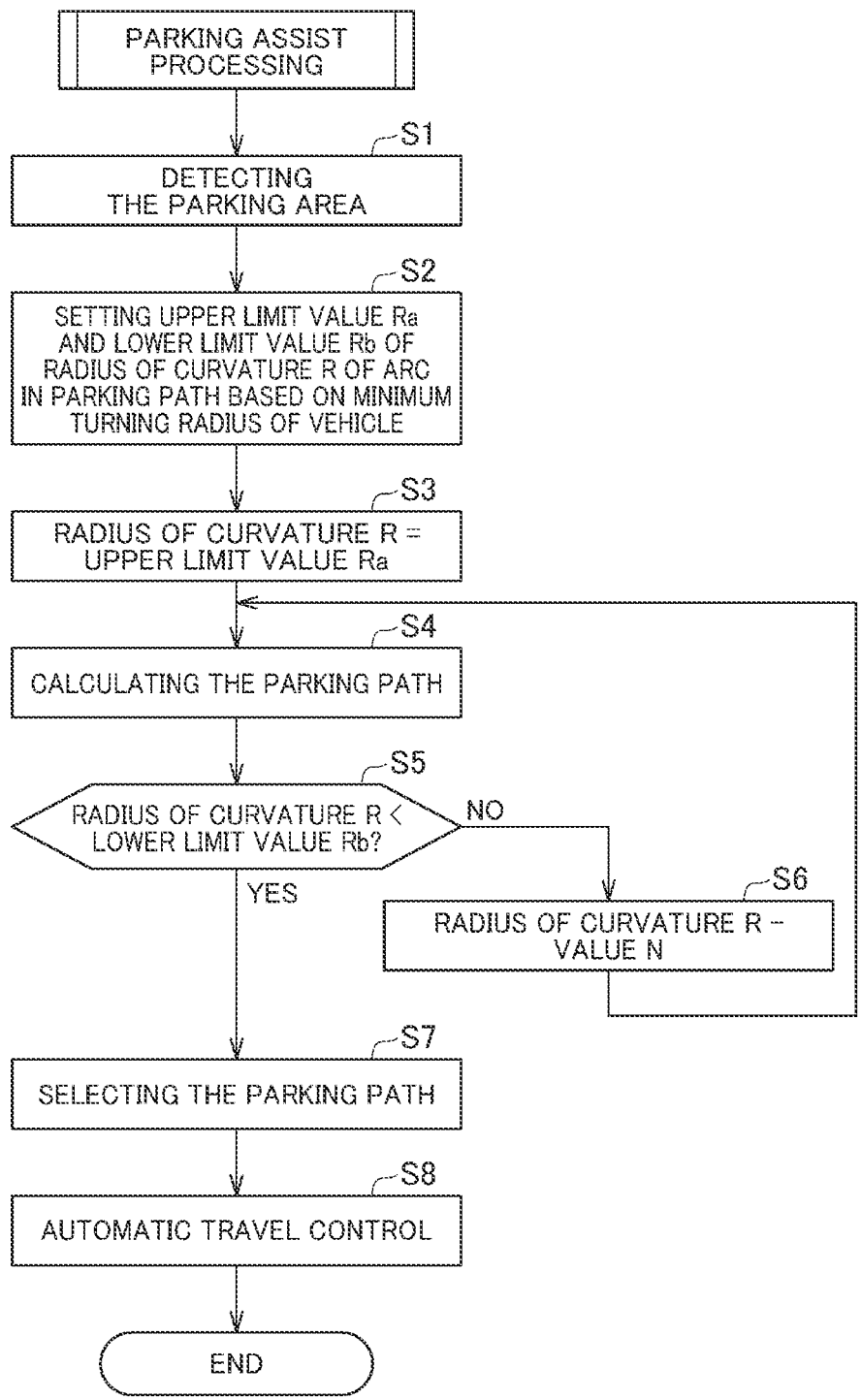
FIG. 3 is a flow chart of parking assist processing.

FIG. 3 is a flow chart of parking assist processing. First of all, the parking assist apparatus 100 detects the parking area Q by the parking area detection unit 113 (Step S1: Parking area detection step). Then, the parking assist apparatus 100 specifies the minimum turning radius of the vehicle 1 by the parking path calculation unit 115 based on the vehicle information 122, and sets the upper limit value Ra and the lower limit value Rb for the radius of curvature R of an arc in a parking path based on the minimum turning radius (Step S2: Range setting step).

In the present embodiment, a value obtained by multiplying a predetermined coefficient K to the minimum turning radius is set as the upper limit value Ra of a radius of curvature R. As the aforementioned coefficient K, a value including a range suitable for improving the ride quality and comfort of passengers while not including an excessively large radius of curvature, for example, the value 5 or an adjacent value on the basis of the value 5, is adopted. As this coefficient K, a manufacturer of the parking assist apparatus 100 or the vehicle 1, or a user of the vehicle 1 or the like can set an appropriate value. As a result, the upper limit value Ra of a radius of curvature R of an arc in a parking path can be set according to small-radius turning ability of the vehicle 1.

Note that the upper limit value Ra may be set to 50% of the maximum steering amount (also referred to as a maximum turning amount) of the vehicle 1. In this case, if the minimum turning radius is 5 m, 10 m, which is twice of it, may be set as the upper limit value Ra. As the upper limit value Ra, an appropriate value can be adopted in a range in which the upper limit value Ra corresponding to small-radius turning ability of the vehicle 1 can be set.

Additionally, in the present embodiment, as the lower limit value Rb of a radius of curvature R of an arc in the parking paths, the smallest turning radius of the vehicle 1 is set. As a result, it is possible to avoid a situation of calculating parking paths that the vehicle 1 cannot turn sufficiently with its smallest turning radius, and it is possible to set the lower limit value Rb of the radius of curvature R corresponding to the vehicle 1. Note that the lower limit value Rb may be set as a value larger than the minimum turning radius of the vehicle 1. For calculating the lower limit value Rb, other calculating formulas having at least the minimum turning radius as an element may be adopted within a range in which the lower limit value Rb corresponding to the small-radius turning ability of the vehicle 1 can be set.

Next, the parking assist apparatus 100 sets a radius of curvature R of an arc in a parking path as the upper limit value Ra (Step S3) by the parking path calculation unit 115, and calculates the parking paths along which the vehicle 1 is moved from the current position to the parking area Q so as to satisfy the radius of curvature R (Step S4). Publicly known calculation processing can be appropriately applied to this calculation processing of parking paths.

Subsequently, the parking path calculation unit 115 determines whether the set radius of curvature R is less than the lower limit value Rb (Step S5), and if it is not less than the lower limit value Rb (Step S5: NO), changes the radius of curvature R to a value obtained by subtracting a predetermined value N from the current radius of curvature R (Step S6) to proceed to the processing of Step S4. The predetermined value N is set to 10 cm, for example. Note that the value N can be changed to various values.

Figure 4:
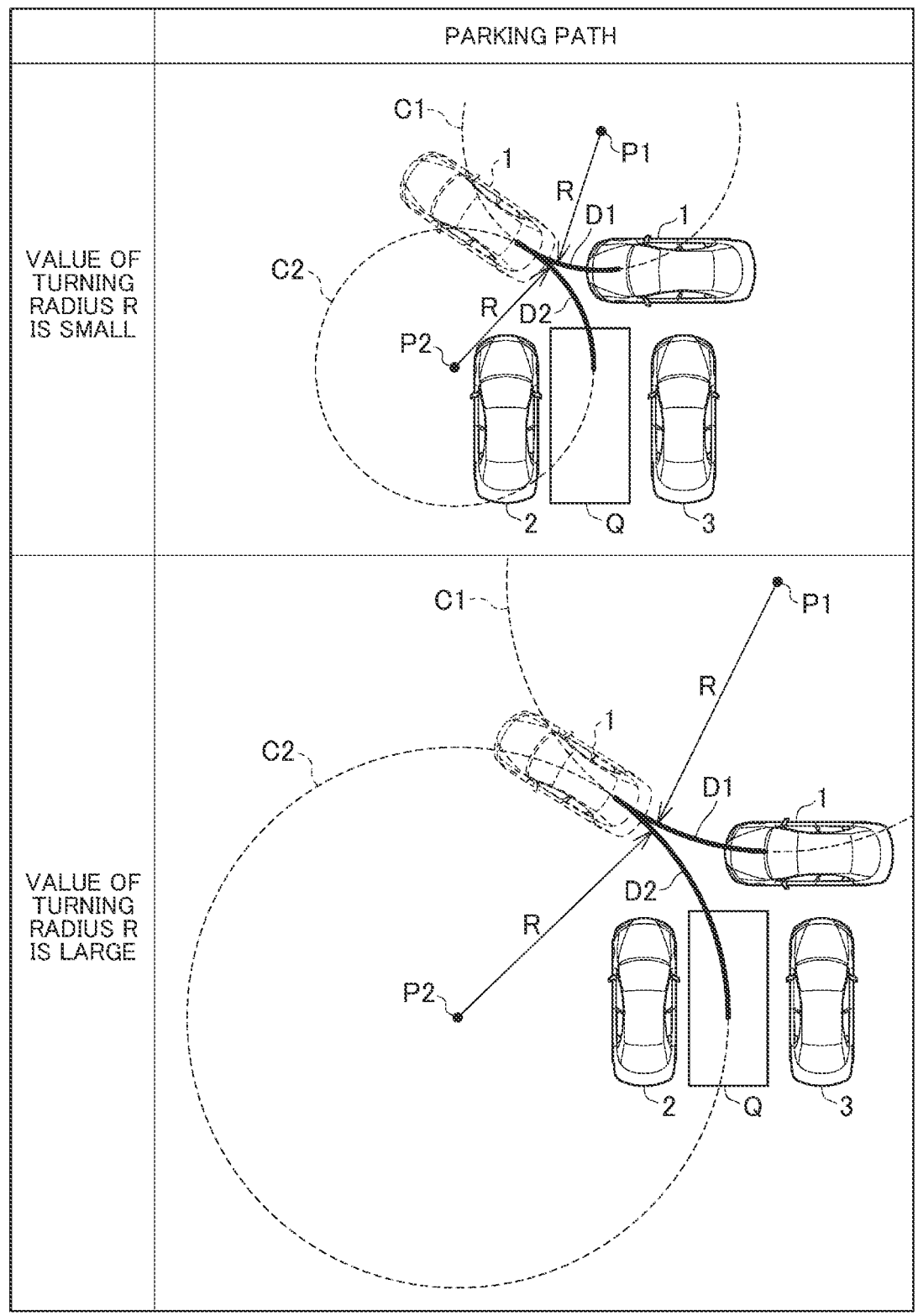
FIG. 4 is a diagram for explaining parking paths.

As a result, as exemplified in FIG. 4, a plurality of patterns of parking paths having a different radius of curvature R is calculated. Note that the reference character D1 in FIG. 4 shows a parking path from the current position to a position in which forward and reverse advance changeover of the vehicle 1 is made (corresponding to the "back-and-forth maneuvering position" shown by a broken line in FIG. 4), and the reference character D2 shows a parking path from the back-and-forth maneuvering position to the parking area Q. Additionally, the radius of curvature R of an arc included in each of the parking paths D1 and D2 is set as the set radius of curvature.

Further, the reference character C1 shows a circle along the arc in the parking path D1, and the reference character P1 shows the center of a circle C1. In addition, the reference character C2 shows a circle along the arc in the parking path D2, and the reference character P2 shows the center of a circle C2.

FIG. 4 is a simplified view of a parking path in a case of parking in the parking area Q by one back-and-forth maneuvering from the current position. As stated above, if it is not possible to calculate a parking path including an arc of the set radius of curvature R, the number of times of back-and-forth maneuvering is changed to calculate the parking path including an arc of the set radius of curvature R; therefore, a parking path with two or more numbers of times of back-and-forth maneuvering is appropriately calculated.

Note that, since parking paths with excessively large numbers of times of back-and-forth maneuvering are not preferable, the upper limit value of the number of times of back-and-forth maneuvering is to be set, and in calculation processing of each parking path, when the parking path cannot be calculated in the range where the number of times of back-and-forth maneuvering is equal to or less than the upper limit value, the calculation processing may be skipped.

The aforementioned steps (S3→S4→S5→S6→S4 . . . ) of calculating a plurality of patterns of parking paths, in which the radius of curvature R described above is differentiated correspond to the parking path calculation step of the present invention. In the present embodiment, since parking paths are calculated until the set radius of curvature R becomes less than the minimum turning radius of the vehicle 1, parking paths, which include an arc having a radius of curvature R that coincides with the minimum turning radius of the vehicle 1, are calculated as well.

If parking paths are calculated until the radius of curvature R becomes less than the minimum turning radius Rb (Step S5: YES), or namely, if a parking path, in which the radius of curvature R is in the range from the upper limit value Ra (K times of the value of the minimum turning radius of the vehicle 1) to the lower limit value Rb (the minimum turning radius of the vehicle 1), is calculated, the parking assist apparatus 100 proceeds to the processing of Step S7.

In the processing of Step S7, the parking assist apparatus 100 selects a parking path having the largest radius of curvature R of an arc from parking paths with the minimum number of times of back-and-forth maneuvering among a plurality of patterns of parking paths calculated by the parking path selection unit 116.

Additionally, the parking assist apparatus 100 generates control information by the automatic travel control unit 117 based on the selected parking path so as to output the control information to the vehicle control apparatus 30 (Step S8). As a result, the vehicle 1 starts automated travel from the current position according to control by the vehicle control apparatus 30, and is parked in the parking area Q. The aforementioned Step S7 corresponds to the parking path selection step of the present invention, and Step S8 corresponds to the automated travel step of the present invention.

Next, a comparative example and the embodiment of the present invention are described.

Figure 5:
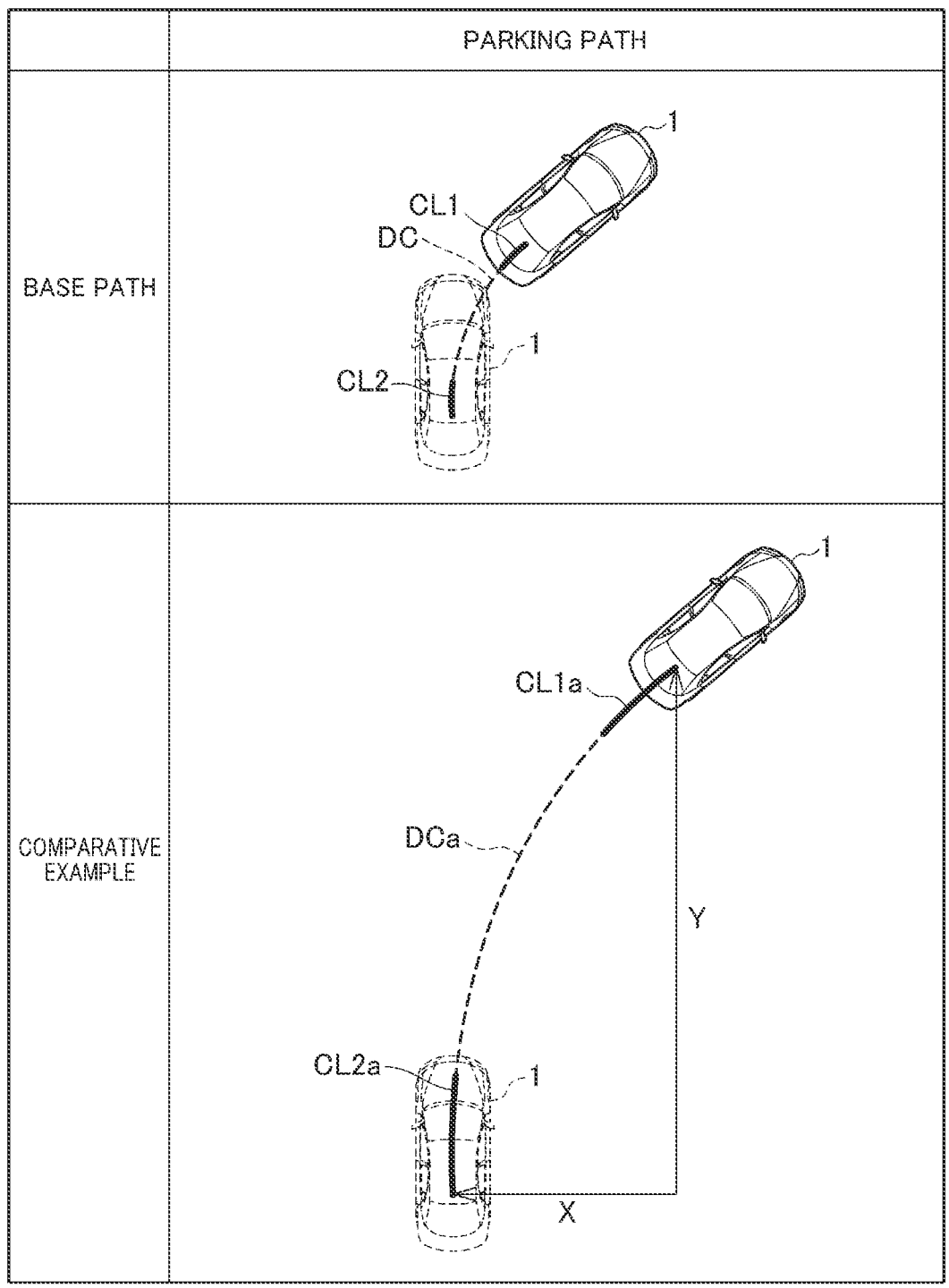
FIG. 5 is a diagram for explaining a comparative example.

As shown in FIG. 5, the comparative example adopts a method of similarly extending a base path, as the basis of a parking path to the parking area Q, so as to generate a parking path connecting the current position and the parking area Q.

The base path is a path generated by using the shortest clothoid curve or arc calculated by predetermined conditions (e.g., predetermined vehicle speed and steering angle). FIG. 5 shows a case where a base path is generated by a predetermined curve DC and clothoid curves CL1 and CL2 added in front and behind the curve DC.

The parking path in the comparative example is generated by independently extending (corresponding to similarly extending) each of portions DC, CL1 and CL2 of the base path in the X and Y directions in FIG. 5. In this case, a curve DCa is a portion obtained by similarly extending the curve DC, and clothoid curves CL1a and CL2a are portions obtained by similarly extending the clothoid curves CL1 and CL2. Since they are similarly extended, the radius of curvature of each portion of the parking path in the comparative example depends on the radius of curvature and the similarity extension ratio of each portion of the base path, and the parking path tends to be easily extended as a whole.

Figure 6:
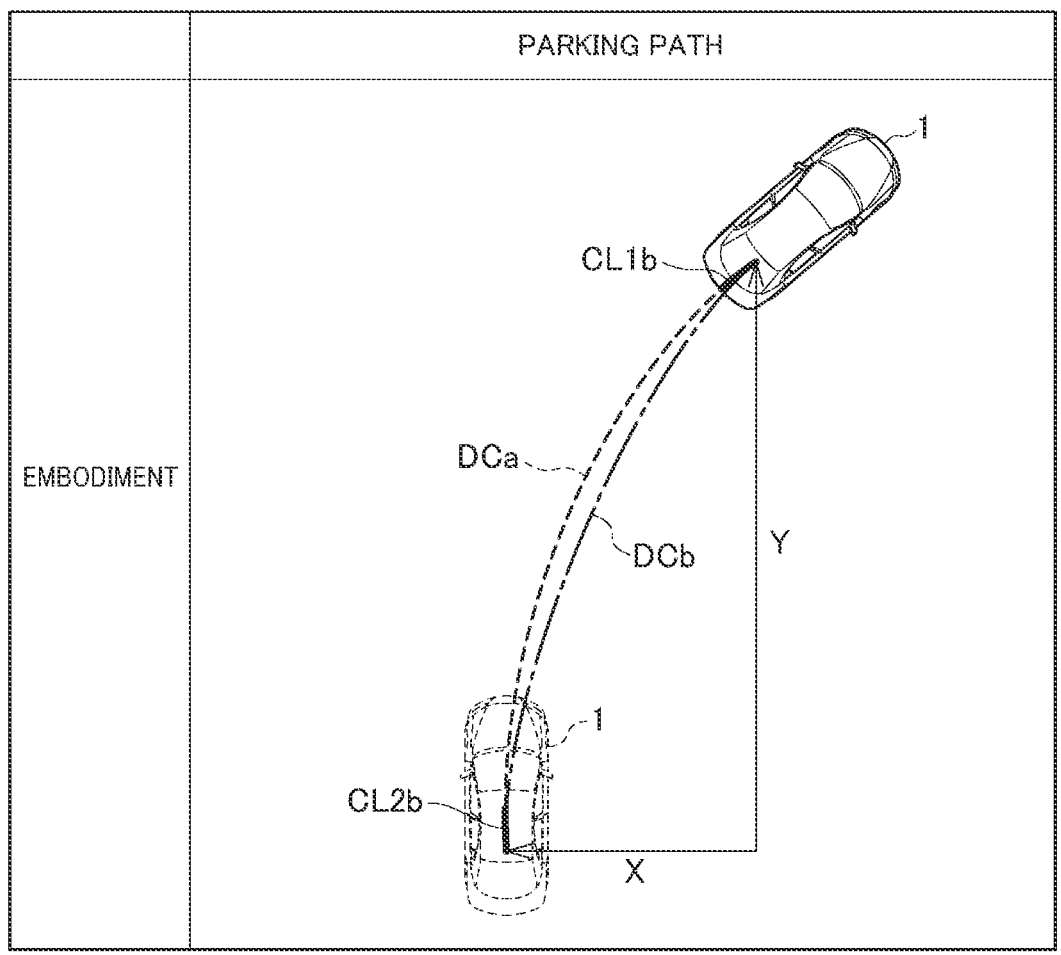
FIG. 6 is a diagram for explaining the embodiment of the present invention.

FIG. 6 schematically shows a parking path in an embodiment of the present invention.

This FIG. 6 shows a case where a parking path of the embodiment is generated by an arc DCb and clothoid curves CL1b and CL2b added in front and behind the arc DCb. FIG. 6 also shows the curve DCa of the parking path in the comparative example at the same time.

In the embodiment of the present invention, an arc DCb in a parking path is configured to be an arc having the largest radius of curvature R among a plurality of patterns of parking paths having a different radius of curvature R. As a result, as shown in FIG. 6, it is possible to obtain a path having a larger radius of curvature than that of the comparative example. Therefore, it becomes easier to obtain, compared to the comparative example, a parking path that is more advantageous for improving the ride quality and comfort of passengers and for reducing the parking time.

In addition, as clothoid curves CL1b and CL2b added in front and behind the arc DCb, it is also possible to adopt curves of approximately the same short distance as the clothoid curves CL1 and CL2 in the base path, and this also enables to obtain parking paths advantageous for reducing parking time.

The present embodiment provides the following effects.

By the parking path calculation unit 115, the parking assist apparatus 100 of the present embodiment calculates, as parking paths along which the vehicle 1 is parked in the parking area Q, a plurality of patterns of parking paths, in which the radius of curvature R of each the arcs included in the parking paths is differentiated, using the minimum turning radius of the vehicle 1 specified by the vehicle information 122 and the recognition result of the peripheral recognition unit 111. Next, the parking assist apparatus 100 selects, by the parking path selection unit 116, a parking path having the largest radius of curvature R from the parking paths having the minimum number of times of back-and-forth maneuvering among the plurality of patters of the parking paths.

As a result, among the plurality of patterns of parking paths, a parking path, which has the minimum number of times of back-and-forth maneuvering (that is, driving operations for changing an advancing direction of the vehicle 1 from forward to reverse or reverse to forward) and the largest radius of curvature of an arc, is selected, and it becomes easier to specify a parking path advantageous for improving the ride quality and comfort of passengers and for reducing the parking time.

Incidentally, a case of using the minimum turning radius of the vehicle 1 among the vehicle information 122 has been described; however, not limited to this, other information related to parking paths of the vehicle 1 may be utilized. For example, as the vehicle information 122, the information on wheelbase and vehicle type, or the evaluation value of preset small-radius turning ability, from which the small-radius turning ability of the vehicle 1 can be estimated to some extent, may be utilized.

In addition, by the parking path calculation unit 115, the parking assist apparatus 100 limits the range of the radius of the curvature R of each of the arcs included in a plurality of patterns of parking paths, based on the minimum turning radius of the vehicle 1.

As a result, it is possible to, while reducing the amount and time of operation necessary for calculating parking paths, calculate a parking path including an appropriate arc taking in consideration of the minimum turning radius.

Moreover, as a plurality of patterns of parking paths, the parking assist apparatus 100 calculates parking paths, in which the radius of curvature R of each of the arcs included in the parking paths is differentiated between the upper limit value Ra and the lower limit value Rb set based on a minimum turning radius of the vehicle 1, by the parking path calculation unit 115.

As a result, it becomes easier to avoid a situation of setting parking paths having an excessively large radius of curvature R, and to avoid a situation of setting parking paths having a sharp carve that the vehicle 1 cannot travel, in consideration of the smallest turning radius of the vehicle 1. Note that a case of setting both of the upper limit value Ra and the lower limit value Rb based on the minimum turning radius of the vehicle 1 has been explained; however, it is possible to set only a threshold of either one of these values and make the other value to be a preset fixed value.

Figure 7:
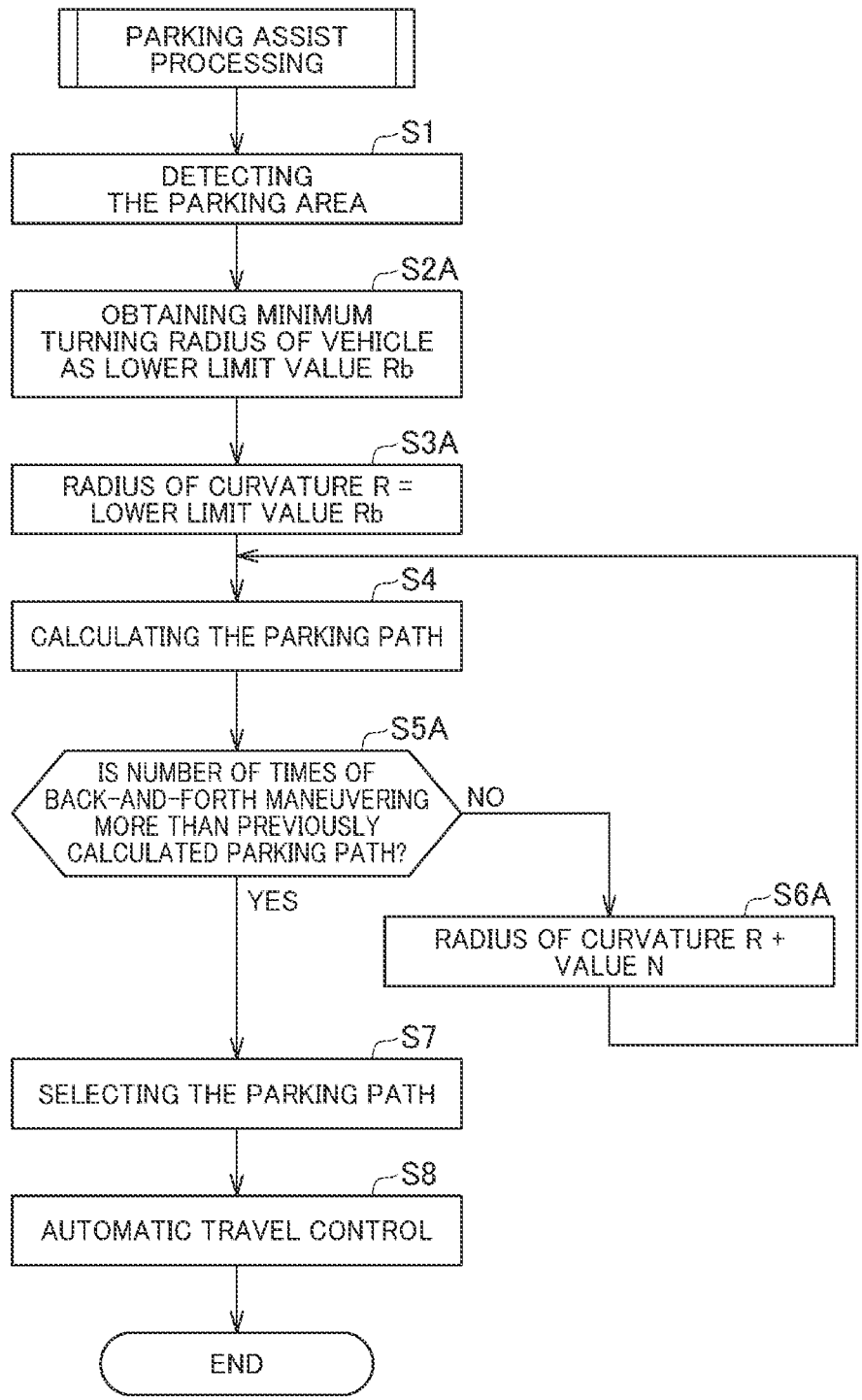
FIG. 7 is a flow chart of parking assist processing according to a modified example.

Here, FIG. 7 shows a flow chart of parking assist processing according to a modified example. Note that the same processings as the steps shown in FIG. 3 are shown with the same numerals to omit redundant description.

The parking assist apparatus 100 specifies, after detecting the parking area Q by the parking area detection unit 113 (Step S1), the minimum turning radius of the vehicle 1 by the parking path calculation unit 115 based on the vehicle information 122 so as to set the specified minimum turning radius to the lower limit value Rb (Step S2A: Range setting step).

Next, the parking assist apparatus 100 sets a radius of curvature R of an arc in a parking path to be the lower limit value Rb by the parking path calculation unit 115 (Step S3A), and calculates a parking path for moving the vehicle 1 from the current position to the parking area Q so as to satisfy the radius of curvature R (Step S4).

Then, the parking assist apparatus 100 determines whether the number of times of back-and-forth maneuvering in the calculated parking path is increased from the previously calculated parking path, by the parking path calculation unit 115 (Step S5A). In this case, if the previous parking path has not been calculated, the determination in Step S5A is set to be a negative result, the radius of curvature R is changed from the current radius of curvature R to a value obtained by adding a predetermined value N (Step S6A) to proceed to the processing of Step S4.

As a result, the processing comprising the aforementioned Steps S4→S5A→S6A→S4 is repeatedly executed so as to calculate a plurality of patterns of parking paths for which the radius of curvature R is incremented by a value N from the lower limit value Rb.

If the number of times of back-and-forth maneuvering in the calculated parking path is increased from the previously calculated parking path (Step S5A: NO), the parking assist apparatus 100 proceeds to the processing of Step S7.

In the processing of Step S7, the parking assist apparatus 100 selects, by the parking path selection unit 116, a parking path having the largest radius of curvature R of an arc from the parking paths having the minimum number of times of back-and-forth maneuvering among the plurality of patterns of calculated parking paths. Then, the parking assist apparatus 100 generates control information by the automatic travel control unit 117 based on the selected parking path and outputs the control information to the vehicle control apparatus 30 (Step S8).

The flow chart shown in FIG. 7 illustrates a parking path in which the radius of curvature R of an arc included in the parking path is gradually increased from the minimum turning radius of the vehicle 1, wherein, if the number of times of back-and-forth maneuvering becomes more than that of the previously calculated parking path, the calculation processing of parking paths is stopped and a parking path having the largest radius of curvature R of an arc is selected from the parking paths. As a result, it is possible to specify a parking path with the minimum number of times of back-and-forth maneuvering and the largest radius of curvature R of an arc by reducing the amount and time of operation.

In addition, since the calculating processing of parking paths in Step S4 is stopped if the number of times of back-and-forth maneuvering in the calculated parking path is more than that of the previously calculated parking path, the processing of setting the upper limit value Ra of the radius of curvature R becomes unnecessary.

However, the upper limit value Ra of the radius of curvature R is set also in the flow chart shown in FIG. 7 based on the minimum turning radius as with the case of the flow chart in FIG. 3, and the operation processing of parking paths in Step S4 may be stopped when the radius of curvature R becomes more than the upper limit value Ra.

That is, if the number of times of back-and-forth maneuvering of the calculated parking path is more than the number of times of back-and-forth maneuvering in the previously calculated parking path or a predetermined number of times composed of the upper limit value Ra, the operation processing of parking paths in Step S4 may be stopped. The predetermined number of times may be appropriately set.

Note that the aforementioned embodiment is just illustrative of one aspect of the present invention, and it is arbitrarily deformable and applicable without departing from the scope of the present invention.

For example, in the aforementioned embodiment, a case where the present invention is applied to the parking assist apparatus 100 shown in FIG. 1 and the control method thereof has been explained, but it is not limited to this. The functional block shown in FIG. 1 is a schematic view showing constitutional elements of the vehicle 1 and the parking assist apparatus 100 by classifying them according to the main processing content so as to make the invention of the present application be understood easily. These constitutional elements can be further classified into a larger number of constitutional elements according to the processing content. It is also possible to classify them such that one constitutional element executes further more processing.

In addition, processing of each constitutional element of the parking assist apparatus 100 may be executed by one hardware, or may be executed by a plurality of hardware. Further, the processing of each constitutional element may be realized by one program, or may be realized by a plurality of programs.

Additionally, processing units of flow charts shown in FIGS. 3 and 7 are obtained by dividing the processings of the parking assist apparatus 100 according to the main processing content. The embodiment is not limited by the way of dividing the processing unit of each flow chart or the title. In addition, the processing orders of the aforementioned flow charts are not limited to the examples shown in the figures.

REFERENCE SIGNS LIST

1 Vehicle
2, 3 Other vehicle
5 Vehicle-mounted network
10 Peripheral detection sensor unit
10A Sonar
10B Camera
20 Vehicle sensor unit
30 Vehicle control apparatus
100 Parking assist apparatus
110 Position detection unit
111 Peripheral recognition unit
111A Peripheral information obtaining unit
111B Obstacle detection unit
111C Map generation unit
113 Parking area detection unit
114 Parking frame setting unit
115 Parking path calculation unit
116 Parking path selection unit
117 Automatic travel control unit
120 Storage unit
121 Control program
122 Vehicle information
Q Parking area
R Radius of curvature
Ra Upper limit value of radius of curvature R
Rb Lower limit value of radius of curvature R
D1, D2 Parking path
C1, C2 Circle along arc in parking path
P1, P2 Center of circle
DC, DCa Curve
DCb Arc
CL1, CL2, CL1a, CL2a, CL1b, CL2b Clothoid curve

What is claimed is:

1. A parking assist apparatus comprising:
a processor and a memory,
wherein the processor includes
a peripheral recognition unit configured to recognize peripheral information of a vehicle;
a parking area detection unit configured to detect a parking area in which the vehicle can be parked by using recognition result of the peripheral recognition unit;
a parking path calculation unit configured to calculate a plurality of patterns of parking paths as parking paths along which the vehicle is parked in the parking area by using information of the vehicle and recognition result of the peripheral recognition unit, the plurality of patterns of parking paths each including an arc, a radius of curvature of which is different from one parking path to another; and
a parking path selection unit configured to select, among the plurality of patterns of parking paths, a parking path with both a minimum number of times of driving operations of back-and-forth maneuvering for changing an advancing direction of the vehicle from forward to reverse or reverse to forward, and the radius of curvature of the arc that is largest,
wherein the memory stores information for allowing a minimum turning radius of the vehicle to be specified,
wherein by the parking path calculation unit of the processor, a value obtained by multiplying a predetermined coefficient to the minimum turning radius of the vehicle is set as an upper limit value of a radius of curvature of the arc and the minimum turning radius is set as a lower limit value of the radius of curvature of the arc,
the parking path calculation unit sets a radius of curvature of an arc in a parking path as the upper limit value, and calculates the parking paths along which the vehicle is moved from the current position to the parking area so as to satisfy the radius of curvature, and changes the radius of curvature to a value obtained by subtracting a predetermined value from the current radius of curvature so as to satisfy the radius of curvature, and repeats the calculation processing for the parking paths along which the vehicle is moved from the current position to the parking area until the set radius of curvature is less than the lower limit value and calculates a plurality of patterns of parking paths having a different radius of curvature, and
when the parking path cannot be calculated in the range where the number of times of back-and-forth maneuvering is equal to or less than the upper limit value, the calculation processing is skipped.

2. A control method of a parking assist apparatus that comprises the steps of:
recognizing peripheral information of a vehicle;
detecting a parking area in which the vehicle can be parked by using recognition result of the peripheral recognition unit; and
calculating parking paths along which the vehicle is parked in the parking area, wherein
the control method comprising:
a parking path calculation step of calculating, as the parking paths, a plurality of patterns of parking paths by using information of the vehicle and recognition result of the peripheral information of the vehicle, the plurality of patterns of parking paths each including an arc, a radius of curvature of which is different from one parking path to another; and a parking path selection step of selecting, among the plurality patterns of parking paths, a parking path with both a minimum number of times of driving operations of back-and-forth maneuvering for changing an advancing direction of the vehicle from forward to reverse or reverse to forward, and the radius of curvature of the arc that is largest, wherein in the parking path calculation step, as the information of the vehicle, referring to the information, which is stored in the memory in advance, for allowing a minimum turning radius of the vehicle to be specified, setting a value obtained by multiplying a predetermined coefficient to the minimum turning radius of the vehicle as an upper limit value of a radius of curvature of the arc and setting the minimum turning radius as a lower limit value of the radius of curvature of the arc, setting a radius of curvature of an arc in a parking path as the upper limit value, and calculating the parking paths along which the vehicle is moved from the current position to the parking area so as to satisfy the radius of curvature, and changing the radius of curvature to a value obtained by subtracting a predetermined value from the current radius of curvature so as to satisfy the radius of curvature, and repeating the calculation processing for the parking paths along which the vehicle is moved from the current position to the parking area until the set radius of curvature is less than the lower limit value and calculating a plurality of patterns of parking paths having a different radius of curvature, and when the parking path cannot be calculated in the range where the number of times of back-and-forth maneuvering is equal to or less than the upper limit value, skipping the calculation processing.

* * * * *